Aug. 25, 1942.  J R. PENISTEN  2,293,759
PROCESS FOR CATALYTIC REFORMING AND DESULPHURIZATION
Filed July 26, 1940
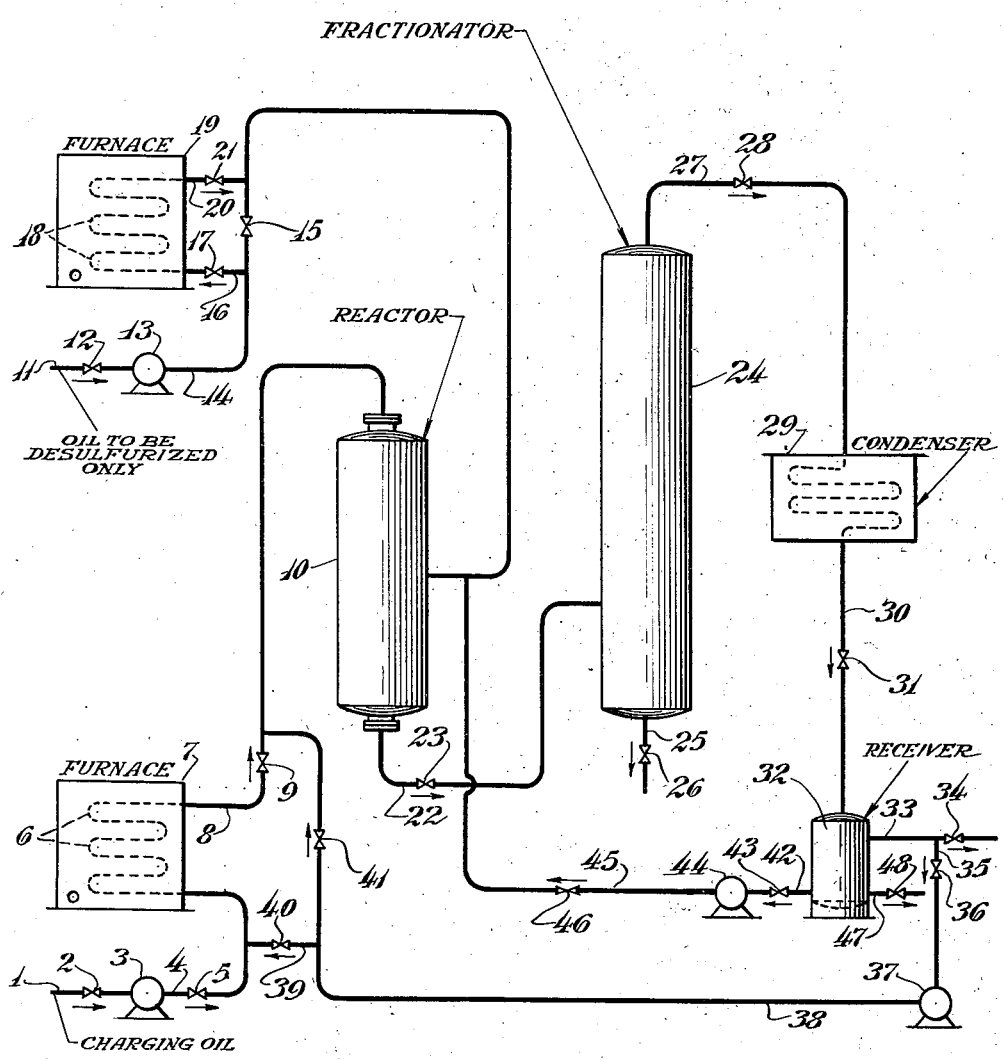
INVENTOR.
J. Robert Penisten
Lee J. Gary
BY
Attorney.

Patented Aug. 25, 1942

2,293,759

UNITED STATES PATENT OFFICE 2,293,759

PROCESS FOR CATALYTIC REFORMING AND DESULPHURIZATION

J Robert Penisten, Chicago, Ill., assignor to Universal Oil Products Company, Chicago, Ill., a corporation of Delaware Application July 26, 1940, Serial No. 347,683

13 Claims. (Cl. 196—52)

This invention relates to a process for the catalytic reforming of a hydrocarbon oil followed by desulphurization to improve its octane rating, lead susceptibility, and reduce sulphur content, and more specifically to a process wherein catalytic reforming and catalytic desulphurization are carried out successfully in a single reaction zone under optimum conditions for each operation.

Catalytic reforming with some of the more common catalysts is usually accomplished at temperatures ranging, for example, from 800 to 1200° F., whereas the optimum temperature range for desulphurization by catalytic methods will usually range from 500 to 800° F. and more specifically from 700 to 800° F. It is customary, therefore, in order to obtain both reforming and desulphurization to employ separate reaction zones for accomplishing each specific reaction.

My invention provides for accomplishing reforming and desulphurization in the same reaction zone by first passing hydrocarbon reactants to be reformed in contact with a bed of catalytic material at the optimum temperature for reforming, subsequently cooling the conversion products thus formed by injecting into the reaction zone a colder stream of hydrocarbon oil which may comprise, for example, a hydrocarbon oil which is to be processed only for sulphur removal, or this colder stream of oil may comprise products formed in the process and the mixture thus formed, which is at the optimum temperature for desulphurization, is then contacted with a bed of catalytic material which is suitable for desulphurizing the mixture. Desulphurization with this method of operation is materially aided by the presence of light gases formed in the reforming reaction.

In my invention, since the oil which is to be used as the cooling medium and which is to undergo treatment for the removal of sulphur only may vary considerably in amount, provisions are made for heating this oil to some temperature below that necessary for desulphurization so that upon mixing with the conversion products from reforming the optimum desulphurization temperature is obtained and at the same time space velocities in the desulphurization section of the reactor may be controlled within the desired limits. By means of this heating step the desulphurization section will not be limited to the treatment of only specific quantities, as might be true if the cooling oil was introduced at atmospheric temperatures and, in such cases, when the volume of oil to be desulphurized may vary the volume of catalyst in the desulphurization section may be made to vary to suit requirements. The use of the second heating would, of course, be obviated where no cooling oil is introduced from an exterior source but where conversion products formed in the process are employed as the cooling oil.

In catalytic reforming, relatively large amounts of carbonaceous materials are formed during the conversion treatment, and it has been found that if a quantity of gases greater than that formed during conversion is present, the rate of carbon formation is decreased, and the invention provides, therefore, for recirculating normally gaseous products formed in the process to the inlet of the reforming section to decrease such carbon formation.

In one embodiment the invention comprises commingling charging oil with normally gaseous products formed as hereinafter set forth, heating the mixture to a catalytic reforming temperature, passing the heated mixture into a reactor divided into two sections, the first section containing a reforming catalyst and the second section a desulphurizing catalyst, cooling the conversion products leaving the first section to a desulphurizing temperature by commingling therewith a colder stream of oil, subjecting the resulting mixture to contact with the desulphurizing catalyst in said second section, fractionating the conversion products leaving said second section to separate fractionated vapors boiling substantially in the range of gasoline from the higher boiling conversion products, recovering the latter, subjecting said fractionated vapors to cooling and condensation, separating the resulting distillate and gas, recovering the former, and commingling at least a portion of said gas with the charging oil as hereinbefore set forth.

The accompanying diagrammatic drawing illustrates in conventional side elevation one specific form of the apparatus which may be used to accomplish the objects of the invention. It is not the purpose of this drawing to limit the invention in any way, for it is recognized that various other forms of apparatus may be substituted for those herein illustrated and described and which may be used to accomplish the same objects without departing from the broad scope of the invention.

Referring to the drawing, charging oil for the process comprising, for example, gasoline, naphtha, and kerosene is supplied through line 1 containing valve 2 to pump 3 which discharges through line 4 containing valve 5 into heating coil 6. When desired, normally gaseous products formed in the process may be commingled with the charging oil in line 4 in the manner to be described and the mixture supplied to heating coil 6. These normally gaseous products may be commingled with the charging oil after heating the latter in coil 6, but the former method is preferred in order to avoid thermal decomposition of the charging oil which may otherwise result in cases where it is necessary to heat the charging oil above the optimum conversion temperature so that upon mixing the two streams the temperature of the mixture is optimum for catalytic reforming. Heating coil 6 receives heat from furnace 7 and the reactants in passing therethrough are heated to a temperature preferably in the range of 800 to 1200° F., although higher temperatures may, in some instances, be desirable. The heated hydrocarbon reactants leaving coil 6 are directed through line 8 containing valve 9 and, as above mentioned, may be commingled with the normally gaseous products, although such is not the preferred method of operation, and the reactants in line 8 thereafter introduced to reactor 10.

Reactor 10, in the case here illustrated, may comprise, for example, one in which the catalyst is contained in relatively small diameter tubular elements which may be heated externally to supply the endothermic heat of reaction by circulating a fluid heat convective medium in contact therewith. On the other hand, reactor 10 may comprise one which contains a plurality of beds of catalytic material and wherein the conversion reactions are accomplished substantially adiabatically. Both catalytic reforming and desulphurization may be accomplished in reactor 10 in the presence of the same or of different catalysts. The colder stream of hydrocarbon oil supplied to reactor 10 in the manner to be described may be introduced at some intermediate point where a continuous bed of catalytic material extending the entire length of the reactor is employed or where a plurality of beds are employed, the colder stream of oil may be injected between any two beds.

Catalytic reforming may be accomplished in the presence of a catalyst mass consisting in general of pellets or granules of alumina or some refractory material such as magnesia or inert siliceous materials composited with compounds of the elements selected from the group consisting of the elements in the left hand columns of Groups IV, V, and VI in the Periodic Table. The catalysts mentioned above, however, are not to be considered as a limiting feature, for various other catalysts capable of effecting the desired reaction and known to those familiar with the art may be employed within its broad scope.

When desired, the same catalyst that is employed for catalytic reforming may also be used for desulphurizing, however, as above mentioned, it is usually desirable to use lower temperatures in the desulphurization section. Other catalysts which may be used for desulphurizing may comprise, for example, silica-alumina composites, bauxite, and clays.

At some intermediate point in reactor 10 a colder stream of hydrocarbon oil is introduced to lower the temperature of the conversion products already formed to a desulphurizing temperature ranging, for example, from 500 to 800° F. This colder stream of oil may comprise, for example, a gasoline fraction from an exterior source which has the desired octane rating but a high sulphur content. In such cases, this hydrocarbon oil may be introduced by way of line 11 containing valve 12 to pump 13. Pump 13 discharges through line 14, and when the quantity of this hydrocarbon is not so great that when mixing with the conversion products in reactor 10 the temperature of the mixture is lowered too far, it may be directed through valve 15 and thereafter introduced to reactor 10. On the other hand, when the quantity of the hydrocarbon oil in line 14 is so great that when mixing with the conversion products in reactor 10 the temperature would be lowered below the desulphurizing temperature, it may be directed through line 16 containing valve 17 into heating coil 18 which receives heat from furnace 19. In passing through coil 18, the oil is preheated to the desired temperature after which it is directed through line 20 and valve 21 into line 14 by means of which it is supplied to reactor 10.

Instead of employing a gasoline as the colder stream of oil as above described, a portion of the products separated in the manner to be described later may be returned to reactor 10 to serve the same purpose. Conversion products leaving reactor 10 are directed through line 22 containing valve 23 into fractionator 24 wherein they are fractionated to separate fractionated vapors boiling substantially in the range of gasoline from the heavier conversion products which are condensed as reflux condensate in the fractionator. Reflux condensate separated in fractionator 24 is removed therefrom by way of line 25 containing valve 26 and may be recovered as a product of the process or may be subjected to any desired further treatment.

Fractionated vapors separated in fractionator 24 are directed through line 27 containing valve 28 to cooling and condensation in condenser 29. Distillate, together with undissolved and uncondensed gases, is directed through line 30 containing valve 31 to collection and separation in receiver 32. Undissolved and uncondensed gases from receiver 32 are removed by way of line 33 and may be recovered as a product of the process by directing them through valve 34. Preferably, however, at least a portion of these gases is returned to the process for use as previously described. In the case here illustrated, this portion is directed through line 35 containing valve 36 to pump 37. Pump 37 discharges through line 38 and a portion but preferably all is directed through line 39 containing valve 40, commingling with the charging oil in line 4. On the other hand, as above mentioned, the gases in line 38 may be directed through valve 41 to be commingled with the heated reactants in line 8.

A portion of the distillate collected and separated in receiver 32 may be returned to the upper portion of fractionator 24 by well known means, not shown, as the refluxing and cooling medium. Another portion of the distillate from receiver 32, as above mentioned, may be commingled with the conversion products in reactor 10 as the colder stream of oil and this may be accomplished by directing it through line 42 containing valve 43 to pump 44 which discharges through line 45 containing valve 46 into line 14, by means of which it is supplied to reactor 10. The residual portion of the distillate collected and separated in receiver 32 is removed therefrom by way of line 47 containing valve 48 and recovered as a prdouct of the process or subjected to any desired further treatment.

An example of one specific operation of the process as it may be accomplished in an apparatus such as illustrated and described is approximately as follows:

A Mid-Continent straight run gasoline of 59° A. P. I. gravity and 52 octane number is commingled with normally gaseous products formed in the process and separated as hereinafter described and the mixture is heated to a temperature of approximately 930° F. and at a superatmospheric pressure of 50 pounds per square inch. The heated vapors and gases are supplied to a reactor divided into two sections, the first section containing an alumina-chromia reforming catalyst and the second section a bed of bauxite desulphurizing catalyst.

The conversion products from the first catalyst section are cooled to a desulphurizing temperature of approximately 750° F. by commingling therewith a stream of California straight run gasoline of 55° A. P. I. gravity and 62 octane number which has been heated to a temperature of approximately 600° F. The resulting mixture is then passed in contact with the bed of bauxite catalyst and the conversion products leaving this section are fractionated to separate fractionated vapors of 400° F. end point from the heavier conversion products and the latter are recovered as a product of the process. Fractionated vapors are subjected to cooling and condensation and the distillate and undissolved and uncondensed gases collected and separated. The distillate is recovered as a product of the process and at least a portion of the undissolved and uncondensed gases commingled with the charging oil in the manner previously described.

From an operation employing conditions as above described one may obtain approximately 92% of 400° F. end point gasoline of 68 octane rating and 0.01 sulphur content, the balance being principally liquid residue, gas, and loss.

I claim as my invention:

1. A process for catalytically reforming and desulphurizing a hydrocarbon oil which comprises heating a stream of said oil to a catalytic reforming temperature, subjecting the steam of heated oil to contact successively with a mass of reforming catalyst and a mass of desulphurizing catalyst and cooling the stream of conversion products leaving said mass of reforming catalyst to a desulphurizing temperature prior to subjecting it to contact with said mass of desulphurizing catalyst by commingling therewith another stream of said oil.

2. The process defined in claim 1 further characterized in that the last named stream of oil is heated to an intermediate temperature such that after mixing with said conversion products the temperature of the resulting mixture is optimum for desulphurization.

3. A process for catalytically reforming and desulphurizing a hydrocarbon oil which comprises heating said oil to a catalytic reforming temperature, subjecting the stream of heated oil to contact successively with a mass of reforming catalyst and a mass of desulphurizing catalyst and cooling the stream of conversion products leaving said mass of reforming catalyst to a desulphurizing temperature prior to subjecting it to contact with said mass of desulphurizing catalyst by commingling therewith another hydrocarbon oil.

4. A process for catalytically reforming and desulphurizing a hydrocarbon oil, which comprises heating a stream of said oil to a reforming temperature, introducing the heated stream of oil to one end of a reaction zone containing a mass of reforming catalyst, withdrawing conversion products from the opposite end, introducing a colder stream of oil intermediate the two ends of said reaction zone in an amount sufficient to maintain a desulphurizing temperature from the intermediate point to the outlet of said zone, fractionating the conversion products to separate reflux condensate and a stream of fractionated vapors, subjecting said stream of fractionated vapors to condensation, separating the resulting distillate from undissolved and uncondensed gases, and combining at least a portion of said undissolved and uncondensed gases with the first-named stream of oil.

5. The process defined in claim 4 further characterized in that the colder stream of hydrocarbon oil comprises a hydrocarbon oil of relatively high sulphur content introduced from an exterior source.

6. The process defined in claim 4 further characterized in that the colder stream of oil comprises an oil introduced from an exterior source and preheated to an intermediate temperature whereby the cooling effect is not excessive upon its introduction to the catalytic reactor.

7. The process defined in claim 4 further characterized in that the colder stream of hydrocarbon oil comprises a portion of the distillate formed in the process.

8. The process defined in claim 4 further characterized in that the catalyst consists essentially of a synthetically prepared alumina chromia catalyst composite.

9. A process for reforming and desulphurizing a hydrocarbon oil, which comprises, subjecting a stream of said oil, heated to a reforming temperature, to contact with a mass of catalyst capable of effecting the desired conversion, combining a colder stream of oil with the resulting conversion products in an amount sufficient to reduce the temperature of the mixture to a desulphurizing temperature, then subjecting said mixture to contact with a mass of desulphurizing catalyst, fractionating the resulting products to separate a reflux condensate and a stream of fractionated vapors, subjecting said stream of fractionated vapors to condensation, separating the resulting distillate from undissolved and uncondensed gases, and combining at least a portion of said undissolved and uncondensed gases with the first-named stream of oil.

10. The process of claim 9 further characterized in that said colder stream of oil comprises distillate formed in the process.

11. A process for the conversion and refining of hydrocarbon oil, which comprises introducing a stream of said oil heated to conversion temperature to one end of a reaction zone, withdrawing conversion products from the opposite end, maintaining a mass of catalyst capable of effecting the desired conversion at the inlet end of said reaction zone and a mass of desulphurizing catalyst at the outlet end, and introducing a stream of colder oil between said masses in an amount sufficient to maintain the temperature of reactants in contact with the second named mass at a desulphurizing temperature.

12. The process of claim 11 further characterized in that said colder stream of oil comprises a distillate fraction of relatively high sulphur content.

13. The process of claim 11 further characterized in that the first named catalyst mass comprises a dehydrogenating catalyst.

J ROBERT PENISTEN.